US012407277B2

(12) United States Patent
Evans

(10) Patent No.: US 12,407,277 B2
(45) Date of Patent: Sep. 2, 2025

(54) METHOD TO GENERATE A LOCALIZED GRAVITATIONAL FIELD AND GRAVITY

(71) Applicant: Andrew Evans, Victoria (CA)

(72) Inventor: Andrew Evans, Victoria (CA)

( * ) Notice: Subject to any disclaimer, the term of this patent is extended or adjusted under 35 U.S.C. 154(b) by 5 days.

(21) Appl. No.: 17/486,030

(22) Filed: Sep. 27, 2021

(65) Prior Publication Data

US 2023/0096540 A1    Mar. 30, 2023

(51) Int. Cl.
*H02N 99/00*   (2006.01)
*B64G 1/12*   (2006.01)
*B64G 1/46*   (2006.01)

(52) U.S. Cl.
CPC ............... *H02N 99/00* (2013.01); *B64G 1/12* (2013.01); *B64G 1/465* (2023.08)

(58) Field of Classification Search
CPC .................................. H02N 99/00; B64G 1/46
See application file for complete search history.

(56) References Cited

U.S. PATENT DOCUMENTS

| | | | |
|---|---|---|---|
| 8,190,553 B2 * | 5/2012 | Routt ..................... | B82Y 10/00 706/62 |
| 2006/0073976 A1 * | 4/2006 | Pohlman ................ | G09B 23/00 505/180 |

OTHER PUBLICATIONS

Localized Gravity in String Theory, Andreas Karch and Lisa Randall, Oct. 27, 2018, Center for Theoretical Physics & Department of Physics Massachusetts Institute of Technology.*
Applications of Conformal Perturbation Theory to Novel Geometries in the Gauge/Gravity Correspondence, Adam Benjam in Clark, 2006, University of Washington Graduate School.*
String Phenomenology in the Era of the LHC, Johar Muhammad Ashfaque, Feb. 2017, University of Liverpool.*

* cited by examiner

*Primary Examiner* — Michael C Zarroli

(57) ABSTRACT

A method of generating a localized gravitational field and gravity in the vicinity of a block of frozen hydrogen that has been polarized with respect to the composite proton and gluon spin. This is a practical application of the theory that polarized gluon spin generates an enhanced excitation of the gluon field in the vicinity of the block of frozen hydrogen which in turn causes a dilation of the particulate space of loop quantum gravity and concurrent dilation of time which becomes gravity.

1 Claim, 3 Drawing Sheets

METHOD TO GENERATE A LOCALIZED GRAVITATIONAL FIELD AND GRAVITY

FIELD OF THE INVENTION

This invention relates to gravity, and more particularly to a method to generate a localized gravitational field and gravity.

BACKGROUND OF THE INVENTION

Governments and private corporations have spent billions of dollars on space exploration and science programs. A large part of this expense has been towards scientific experiments requiring zero gravity, which is currently only possible in outer space or at a microgravity research facility for short periods. There exists no Earth-bound facility or methodology to provide for long term zero gravity experimentation. Therefore, there is a scientific and financial incentive to effectively solve this problem.

During extended space programs, astronauts face health and operational challenges of living and working in zero gravity. The only envisioned method of providing artificial gravity is through the use of rotating rings to produce centrifugal force in a rotating frame of reference. There are currently no practical applications of this concept due to the size and cost of the spacecraft required to carry such a large mechanical system. Therefore, there are strong health and operational incentives to effectively solve this problem.

High G force training using a centrifuge is commonly done for astronauts and military pilots who must be preconditioned to face very high gravitational forces from rapid acceleration in their spacecraft or aircraft. The centrifuge used in this training is large and expensive. Therefore, there is a strong training and cost benefit to produce high G forces with less cost and greater efficiency.

In 2021, a theory of gravity known as "An Examination of Gluon Field Excitation as the Initiating Cause of Time Dilation, Gravity and Dark Matter" ("the Theory of Gravity") was published in which the initiating cause of gravity is gluon spin, leading to an excitation of the gluon field surrounding a gravitational body such as a planet. This is analogous to electron spin as the known cause of the magnetic field surrounding a magnet. However, a magnetic field is very strong when compared to gravity because the electron spin within a magnet is polarized, that is all the free electrons spin in the same direction within the magnet, while the gluons within a planet are spinning in random directions.

Further in the present concept, within the Theory of Gravity the excitation of the gluon field leads to the dilation of particulate space in what is known in the scientific community as loop quantum gravity which holds that space itself is comprised of particles. The Theory of Gravity proposes that this particulate space dilates with the addition of energy, such as is provided with the excitation of the gluon field as explained. Light travels between these particles of space, therefore the size of the particles defines the speed of light and the speed of time and a dilation of the particles of space results in a dilation of time.

There is acceptance within the scientific community that according to General Relativity, gravity is caused by the warping of spacetime, referring to the gradient of time dilation above the gravitational body. Objects fall to Earth because time travels slower on Earth than it does above the Earth. Therefore, in the present concept, the initiating cause of gravity is gluon spin leading to an excitation of the gluon field, leading to the dilation of particulate space and concurrent dilation of time.

Polarized frozen hydrogen does not exist in natural form. As such the material used in the present invention has markedly different characteristics from any found in nature.

It is known in the scientific community that subatomic particles such as electrons, protons and gluons have spin. It is further known that it is possible to generate a stable, polarized spin of protons within a solid material, such as frozen hydrogen, by passing a strong magnetic field back and forth along that material. It is also known that gluon spin constituent within a proton is a major contributing factor to the proton spin. Therefore, it is accepted that the action of polarizing proton spin results in a polarization of gluon spin.

It is known in the scientific community that a gluon field comprises all of space in the universe and the Theory of Gravity holds that gluon spin within a gravitational body leads to an excitation of the gluon field external to that body, with that excitation diminishing at a rate of the radius squared from the center of that body. This excitation is analogous to the excitation of the magnetic field surrounding a bar magnet.

It is known in the scientific community that a bar magnet is magnetic because electron spin within the magnet is polarized, leading to the enhanced excitation of the magnetic field surrounding the magnet. Analogous to this concept, the Theory of Gravity holds that the polarization of gluon spin within a material will lead to an enhanced excitation of the surrounding gluon field, leading to a dilation of the particulate space of loop quantum gravity, and a dilation of time and hence gravity.

OTHER REFERENCES

An Examination of Gluon Field Excitation as the Initiating Cause of Time Dilation, Gravity and Dark Matter; Andrew B. Evans, Victoria, Canada, published Oct. 29, 2021, A Short Review of Loop Quantum Gravity, Abhay Ashtekar & Eugenio Bianchi, Institute for Gravitation and the Cosmos, Penn State University, Apr. 9, 2021

Evidence for Polarization of Gluons in the Proton; Daniel de Florian, Rodolfo Sassot, Marco Stratmann, and Werner Vogelsang, Phys. Rev. Lett. 113, 012001—Published 2 Jul. 2014

Monitoring the build-up of hydrogen polarization for polarized Hydrogen-Deuteride (HD) targets with NMR at 17 tesla; T. Ohta, M. Fujiwara, T. Hotta, I. Ide, K. Ishizaki, H. Kohri, Y. Yanai, M. Yosoi, Research Center for Nuclear Physics, Osaka, Japan Spinning Gluons in the Proton, Steven D. Bass, marian Smoluchowski Institute of Physics, Jagiellonian University, Krakow, Poland, Mar. 6, 2017

Patent Specification

The patent specification is based on the scientific theory "An Examination of Gluon Field Excitation as the Initiating Cause of Time Dilation, Gravity and Dark Matter" ("the Theory of Gravity") developed by the First Named Inventor, which in turn has a background in the well known scientific theories of General Relativity and Loop Quantum Gravity.

It is accepted in the scientific community that time dilates near a gravitational body, such as a planet or star, known in the Theory of General Relativity as the warping of spacetime, and this dilation of time is responsible for gravity as objects naturally move towards a slower rate of time.

Loop Quantum Gravity holds that all of space is particulate with such particles being approximately 10-35 meters in size.

The Theory of Gravity holds that it is the size of the individual particles of particulate space that determine the local rate of time, and that an energy surrounding a gravitational body, such as a planet or star, causes a dilation of the particles of particulate space and resulting dilation of time, collectively known as the warping of spacetime or the gravitational field. This gravitational field is the cause of gravity.

The Theory of Gravity further holds that the energy surrounding a gravitational body consists of the gluon field that comprises all of space, with a greater excitation of the gluon field surrounding a gravitational body arising from gluon spin within the atomic structure of the gravitational body.

Subatomic particles such protons and gluons hold the property of angular momentum, commonly known as spin. In normal matter, gluons spin in random directions giving rise to a very weak force of gravity. Experimentation has shown that polarization of gluon spin can be achieved within a block of frozen hydrogen by running that block back and forth through a strong magnetic field.

The Theory of Gravity holds that if gluon spin within a material should be polarized, such polarization will generate a greater than normal excitation of gluon field surrounding the material leading to a dilation of particulate space, a dilation of time and increased gravity.

Practical Applications

The present invention can be used to increase gravity on a spacecraft in order to provide a more workable environment for astronauts.

The present invention can be used to offset gravity on Earth in order to provide a low gravity/zero gravity environment where necessary for chemical or electronic purposes.

The present invention can be used to increase gravity on Earth where necessary for astronaut and pilot training.

SUMMARY OF THE INVENTION

The present invention is directed to a method to generate a localized gravitational field and gravity with the needs enumerated above and below.

The present invention is directed to a method to generate a localized gravitational field and gravity in the vicinity of a block of frozen hydrogen, polarized with respect to the composite proton and gluon spin. The material so described has markedly different characteristics than those found in nature. The material so described has the unexpected property that it generates an enhanced excitation of the gluon field surrounding the material, leading to a dilation of particulate space and dilation of time which results in gravity.

The block of frozen hydrogen is composed of atoms, which in turn are composed of protons, which in turn are composed of quarks and gluons. Passing this block of frozen hydrogen back and forth through a strong magnetic field results in the polarization of the spin of the protons and gluons.

It is a feature of the present invention to provide a method for generating a localized gravitational field and gravity for the purpose of increasing or decreasing gravitational pull on Earth or any other planet or increasing gravitational pull in outer space.

Enablement

Hydrogen can be frozen by taking it to a temperature below 14.01° Kelvin. The block of frozen hydrogen so formed can be polarized with respect to proton and gluon spin by passing the block back and forth through a strong magnetic field.

When used to generate gravity on board a spacecraft, the block of polarized frozen hydrogen can be positioned on the exterior wall of the spacecraft, in a housing that is open to the near absolute zero temperature of outer space and with the direction of polarization of gluon spin towards the intended direction of gravitational pull inside and outside the spacecraft. Astronauts inside and outside the spacecraft and standing against the housing will experience gravitational pull towards the frozen hydrogen.

When used to generate a gravity reduced or gravity free region above the Earth, the block of polarized frozen. hydrogen can be positioned above the Earth in a freezer or insulated container capable of maintaining a temperature below 14.01° Kelvin and with the direction of polarization of gluon spin towards the intended direction of gravitational pull towards the frozen hydrogen and away from the gravitational pull of the Earth. As depicted in FIG. 2, gravitational attraction towards the block of polarized frozen hydrogen and towards the Earth will result in a gravity free region above the Earth. An object placed in the gravity free region will experience no gravity.

When used to generate a gravity strengthened region above the Earth, the block of polarized frozen hydrogen can be positioned on the Earth in a freezer or insulated container capable of maintaining a temperature below 14.01° Kelvin and with the direction of polarization of gluon spin towards the Earth. As indicated in FIG. 3, a person positioned on top of the block of frozen hydrogen will experience strengthened gravitational attraction towards the block of frozen hydrogen and the Earth.

DRAWINGS

These and other features, aspects and advantages of the present invention will become better understood with reference to the following description and appended claims and accompanying drawings wherein.

DESCRIPTION

The preferred embodiments of the present invention are illustrated by way of example below and in FIGS. 1-4. The method of generating a localized gravitational field and gravity makes use of a block of frozen hydrogen, which is composed of protons and gluons, the spin of which is directionally polarized by the method of passing the block of frozen hydrogen back and forth through a powerful magnetic field. The block of polarized frozen hydrogen has the unexpected quality that it generates an enhanced excitation of the surrounding gluon field that results in a strong gravitational pull towards the block of frozen hydrogen.

Figure 1:
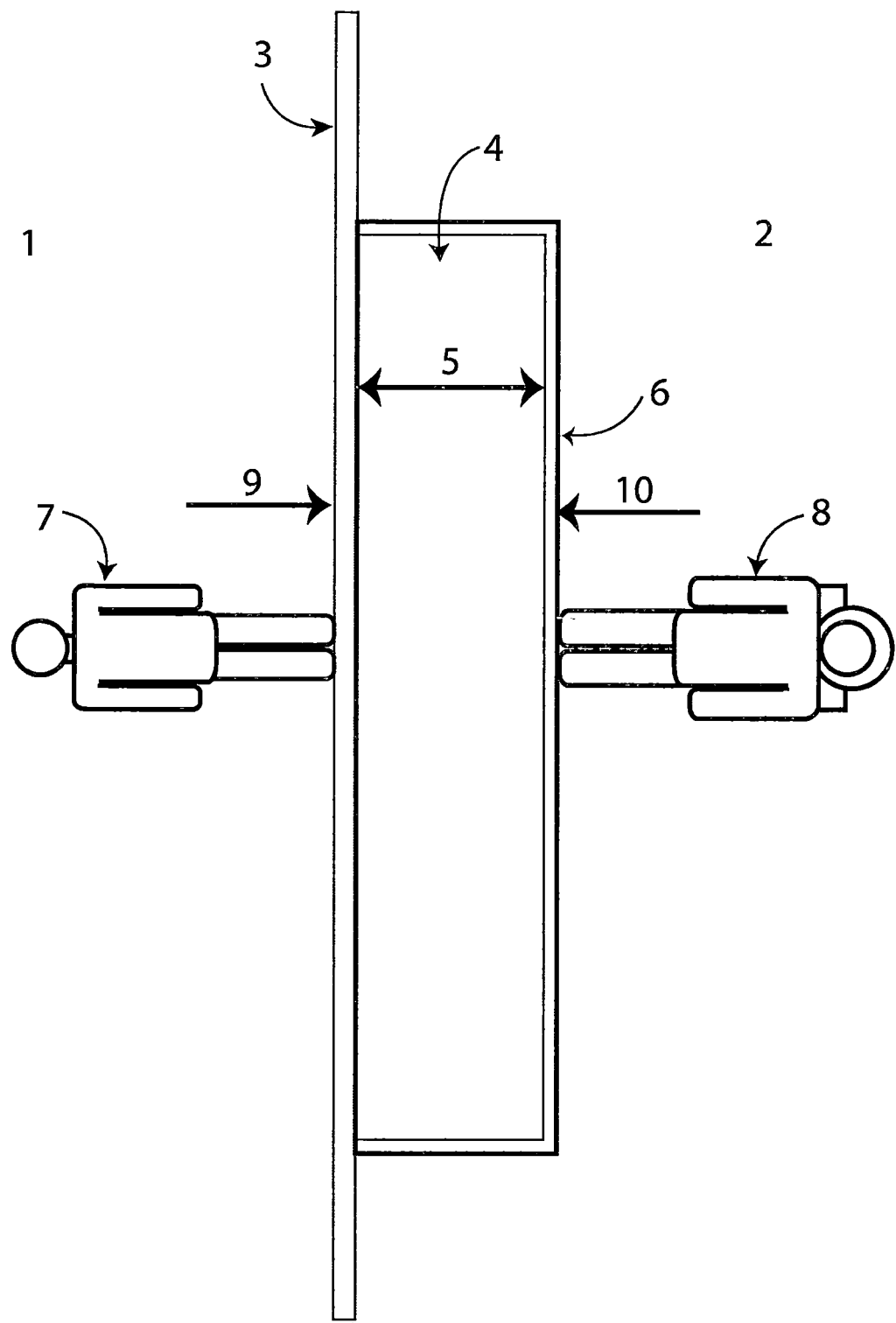
FIG. 1 is a front view of the present invention in use to generate gravity inside and outside a space craft in outer space.

FIG. 1 shows a typical embodiment of the invention on board a space craft in outer space, when used to generate gravity on board the space craft. All the elements of the present invention. may be housed along an outside wall of the space craft to take advantage of the temperature of outer space which is below the freezing temperature of hydrogen of 14.01 degrees Kelvin. In this embodiment, the total amount of gravitational pull is proportional to the total mass of the block of polarized frozen hydrogen and the intensity of gravitational pull is proportional to the thickness of polarized frozen hydrogen directly under the astronaut. The block of polarized frozen hydrogen generates an enhanced excitation of the surrounding gluon field which results in a strong gravitational pull towards the block of frozen hydrogen. As shown in FIG. 1, in this embodiment the block of polarized frozen hydrogen results in a gravitational field and gravity inside and outside of the space craft.

Figure 2:
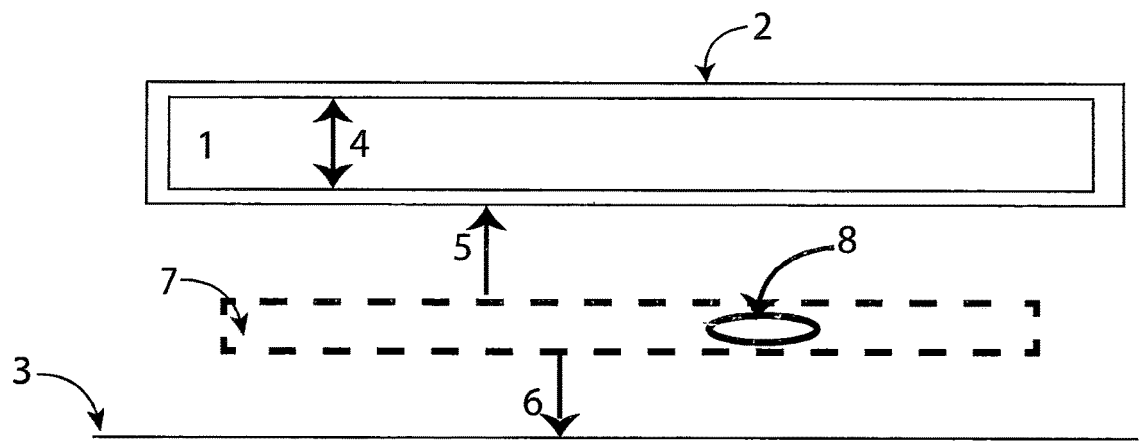
FIG. 2 is a front view of the present invention in use to generate gravity in order to create a gravity-reduced or gravity-free zone above the Earth.

FIG. 2 shows a typical embodiment of the invention on Earth when used to offset the gravity of the Earth and generate a gravity-reduced or gravity-free region above the Earth. All the elements of the present invention should be housed in a freezer or insulated container that is capable of maintaining a temperature below the freezing temperature of hydrogen of 14.01 degrees Kelvin. As shown in FIG. 2, in this embodiment if the block of polarized frozen hydrogen is positioned above the Earth, the result is a region of offsetting gravitational pull and a gravity free region above the Earth. In this embodiment the area of the region of offsetting gravitational pull and the area of the gravity free region is proportional to the total mass of the block of polarized frozen hydrogen and the intensity of gravitational pull is proportional to the thickness of polarized frozen hydrogen.

Figure 3:
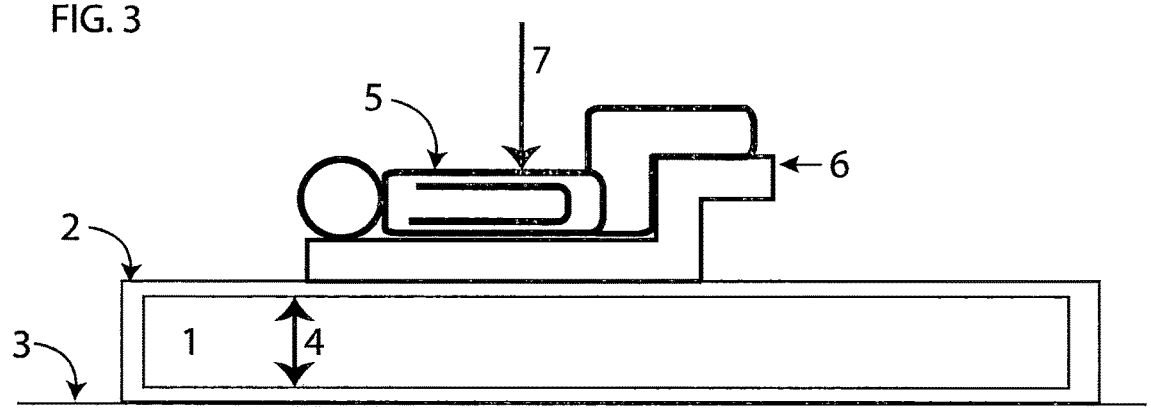
FIG. 3 is a front view of the present invention in use to generate gravity in order to create a stronger gravitational pull on Earth.

FIG. 3 shows a typical embodiment of the invention on Earth when used to generate a gravity strengthened region above the Earth and the invention. All the elements of the present invention should be housed in a freezer or insulated container that is capable of maintaining a temperature below the freezing temperature of hydrogen of 14.01 degrees Kelvin. As shown in FIG. 3, in this embodiment if the block of polarized frozen hydrogen is positioned on the Earth, the result is a region of strengthened gravitational pull above the block. In this embodiment the area of the region of strengthened gravitational pull is proportional to the total mass of the block of polarized frozen hydrogen and the intensity of gravitational pull is proportional to the thickness of polarized frozen hydrogen.

Figure 4:
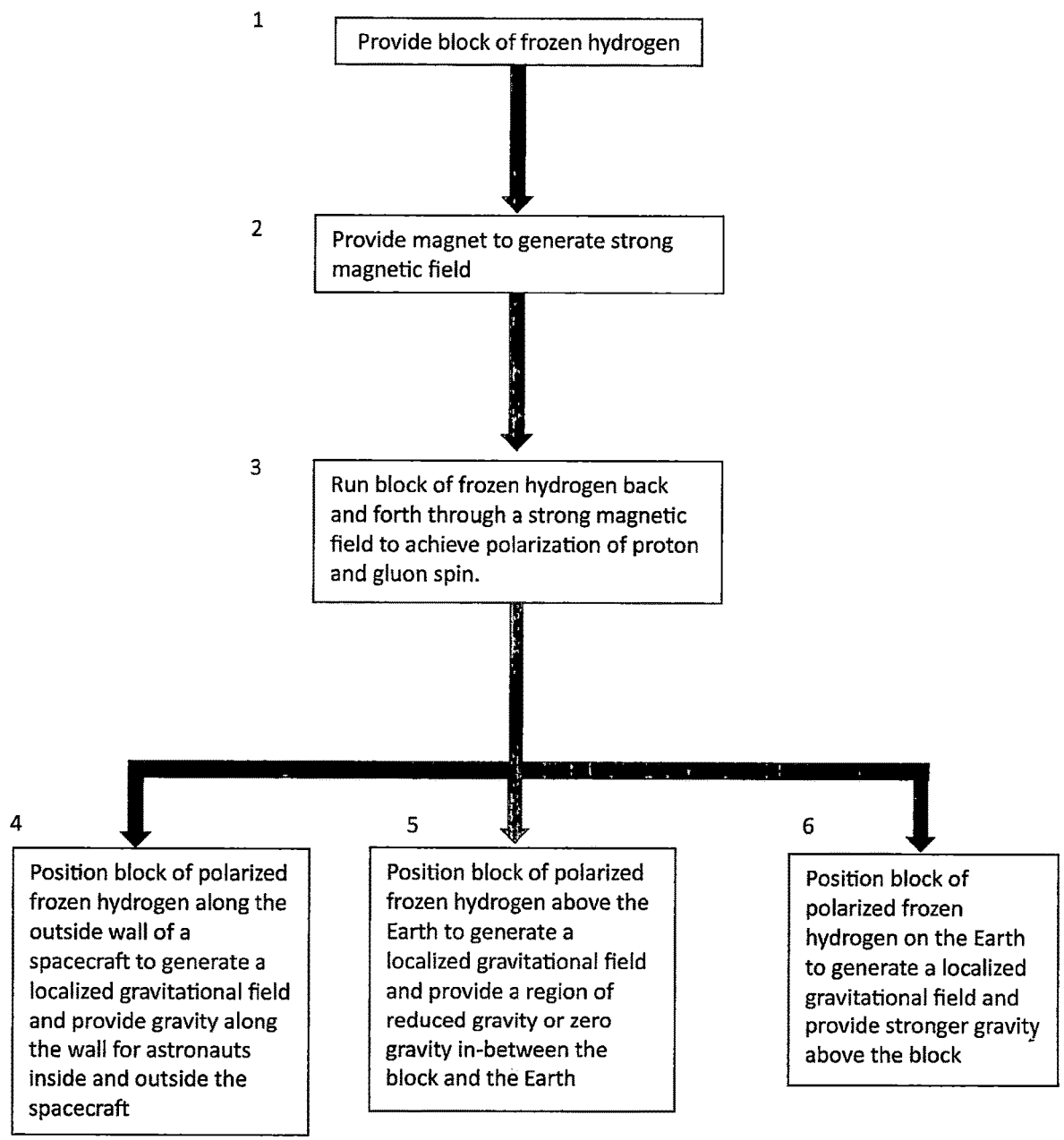
FIG. 4 show a block diagram of the methodology used to create the block of polarized frozen hydrogen and the Claimed uses of that to produce a gravitational field and gravity.

FIG. 4 shows a block diagram description of the process of creating a block of polarized frozen hydrogen and the claimed uses for the invention.

FIGURES

FIG. 1
1. Region inside of space craft.
2. Region outside of space craft.
3. Exterior wall of space craft.
4. Block of frozen hydrogen, polarized with respect to proton and gluon spin.
5. Direction of polarization of gluon spin.
6. Exterior housing, open to the near absolute zero temperature of outer space.
7. Astronaut inside space craft, standing against exterior wall and the present invention.
8. Astronaut outside space craft, standing against exterior housing and the present invention.
9. Direction of gravitational attraction on inside astronaut towards the present invention.
10. Direction of gravitational attraction on outside astronaut towards the present invention.

FIG. 2
1. Block of frozen hydrogen, polarized with respect to proton and gluon spin
2. Exterior housing, refrigerated or insulated to maintain temperature near absolute zero
3. Surface of the Earth
4. Direction of polarization of gluon spin
5. Direction of gravitational attraction towards the present invention
6. Direction of gravitational attraction towards the Earth
7. Gravity-free region
8. Object floating within gravity-free region FIG. 3
1. Block of frozen hydrogen, polarized with respect to proton and gluon spin
2. Exterior housing, refrigerated or insulated to maintain temperature near absolute zero
3. Surface of the Earth
4. Direction of polarization of gluon spin.
5. Person positioned to be subject to strengthened gravitation pull and G force
6. Chair in position to hold the person of item 5 while subject to strengthened gravitation pull
7. Direction of strengthened gravitational attraction towards the present invention and the Earth FIG. 4
Block diagram depicting the process of polarization of proton and gluon spin within a block of frozen hydrogen and subsequent uses for the invention
1. Provide block of frozen hydrogen
2. Provide magnet to generate strong magnetic field
3. Run block of frozen hydrogen back and forth through a strong magnetic field to achieve polarization of proton and gluon spin
4. Position block of polarized frozen hydrogen along the outside wall of a spacecraft to generate a localized gravitational field and provide gravity along the wall for astronauts inside and outside the spacecraft
5. Position block of polarized frozen hydrogen above the Earth to generate a localized gravitational field and provide a region of reduced gravity or zero gravity in-between the block and the Earth

What is claimed is:
1. A method to generate a localized gravitational field aboard a space craft in outer space:
provide a block of frozen hydrogen along an outside wall of the space craft hull;
provide the block of frozen hydrogen that includes protons and gluons spinning;
provide a magnet with a magnetic field strong enough to polarize the proton and gluon spins;
run the block of frozen hydrogen back and forth through the magnetic field thereby polarizing the proton and gluon spins;

wherein these polarized spins of protons and gluons will generate a localized gravitational field.

* * * * *